(12) United States Patent
Groskreutz et al.

(10) Patent No.: US 10,274,228 B2
(45) Date of Patent: Apr. 30, 2019

(54) PACKAGED HVAC UNIT WITH SECONDARY SYSTEM CAPABILITY

(71) Applicant: Trane International Inc., Davidson, NC (US)

(72) Inventors: Mark E. Groskreutz, Tyler, TX (US); John David Williams, Tyler, TX (US)

(73) Assignee: Trane International Inc., Davidson, NC (US)

( * ) Notice: Subject to any disclaimer, the term of this patent is extended or adjusted under 35 U.S.C. 154(b) by 0 days.

(21) Appl. No.: 15/497,699

(22) Filed: Apr. 26, 2017

(65) Prior Publication Data

US 2017/0314820 A1    Nov. 2, 2017

Related U.S. Application Data

(60) Provisional application No. 62/329,020, filed on Apr. 28, 2016.

(51) Int. Cl.
*F25B 5/02* (2006.01)
*F25B 13/00* (2006.01)
(Continued)

(52) U.S. Cl.
CPC .............. *F25B 5/02* (2013.01); *F25B 13/00* (2013.01); *F25B 49/005* (2013.01); *F24F 11/32* (2018.01);
(Continued)

(58) Field of Classification Search
CPC ........ F25B 5/02; F25B 49/022; F25B 49/005; F25B 31/002; F25B 30/02;
(Continued)

(56) References Cited

U.S. PATENT DOCUMENTS 3,631,921 A * 1/1972 Pedersen ............ G05D 23/2754
                                                           165/217
4,517,810 A    5/1985 Foley et al.
(Continued)

OTHER PUBLICATIONS

G. D. Short, T. E. Rajewski, J. E. Oberle, "Refrigeration Lubricants—Current Practice and Future Development" (1996), International Refrigeration and Air Conditioning Conference. Paper 335, http://docs.lib.purdue.edu/iracc/335.

*Primary Examiner* — Emmanuel Duke
(74) *Attorney, Agent, or Firm* — The Salerno Law Firm, P.C.

(57) ABSTRACT

Disclosed is a system for independently controlling the climate within a primary zone and at least one secondary zone of a building. The system comprises a primary packaged unit comprising a primary indoor coil and a primary variable speed indoor fan blowing over the primary indoor coil to serve the primary zone of the building. The system further comprises a secondary unit comprising a secondary indoor coil circulating the refrigerant and a secondary variable speed indoor fan blowing over the secondary indoor coil to serve a secondary zone of the building. The primary unit and the at least one secondary unit shares a common variable speed compressor, outdoor coil, and an outdoor fan that are disposed within the primary unit. First and second solenoid valves in the primary unit selectively control refrigerant flow to the primary and secondary units to enable independent control of the zones.

21 Claims, 9 Drawing Sheets

HEAT PUMP - HEATING MODE (51) Int. Cl.
    *F25B 49/00* (2006.01)
    *F24F 11/32* (2018.01)
    *F25B 49/02* (2006.01)

(52) U.S. Cl.
    CPC ....... *F25B 49/02* (2013.01); *F25B 2313/0233* (2013.01); *F25B 2600/0253* (2013.01); *F25B 2700/2104* (2013.01); *Y02B 30/741* (2013.01)

(58) Field of Classification Search
    CPC ........ F25B 2313/0233; F25B 2313/023; F24F 11/001; F24F 11/02; F24F 11/62; F24F 11/006; F24F 11/30; F24F 11/32
    See application file for complete search history.

(56) References Cited

U.S. PATENT DOCUMENTS

| | | | |
|---|---|---|---|
| 4,748,822 A | 6/1988 | Erbs et al. | |
| 4,760,707 A * | 8/1988 | Dennis | F25B 5/00 62/197 |
| 5,039,009 A | 8/1991 | Baldwin et al. | |
| 5,056,330 A | 10/1991 | Isobe et al. | |
| 5,074,120 A | 12/1991 | Kitamoto | |
| 5,077,982 A * | 1/1992 | Shaffer, Jr. | F24F 3/065 62/174 |
| 5,276,630 A | 1/1994 | Baldwin et al. | |
| 5,377,503 A | 1/1995 | Reedy et al. | |
| 5,461,877 A | 10/1995 | Shaw et al. | |
| 5,692,385 A | 12/1997 | Hollenbeck et al. | |
| 5,911,747 A | 6/1999 | Gauthier | |
| 5,987,908 A | 11/1999 | Wetzel | |
| 6,170,271 B1 | 1/2001 | Sullivan | |
| 6,637,667 B2 | 10/2003 | Gauthier et al. | |
| 6,644,049 B2 | 11/2003 | Alford | |
| 6,659,726 B2 | 12/2003 | Holden | |
| 6,701,741 B2 | 3/2004 | Liu | |
| 6,711,907 B2 | 3/2004 | Dinnage et al. | |
| 6,792,766 B2 | 9/2004 | Osborne et al. | |
| 6,868,678 B2 | 3/2005 | Mei et al. | |
| 7,000,422 B2 | 2/2006 | Street et al. | |
| 7,062,930 B2 | 6/2006 | Rayburn | |
| 7,188,482 B2 | 3/2007 | Sadegh et al. | |
| 7,226,273 B2 | 6/2007 | Doerr et al. | |
| 7,341,201 B2 | 3/2008 | Stanimirovic | |
| 7,421,850 B2 | 9/2008 | Street et al. | |
| 7,555,364 B2 | 6/2009 | Poth et al. | |
| 7,603,873 B2 | 10/2009 | Tonin | |
| 7,726,140 B2 | 6/2010 | Rayburn et al. | |
| 7,797,958 B2 | 9/2010 | Alston et al. | |
| 8,030,880 B2 | 10/2011 | Alston et al. | |
| 8,078,325 B2 | 12/2011 | Poth | |
| 8,214,270 B2 | 7/2012 | Schaefer et al. | |
| 8,335,593 B2 | 12/2012 | Johnson et al. | |
| 8,346,397 B2 | 1/2013 | Harrod et al. | |
| 8,381,540 B2 | 2/2013 | Alston | |
| 8,397,522 B2 | 3/2013 | Springer et al. | |
| 8,645,495 B2 | 2/2014 | Johnson et al. | |
| 8,798,804 B2 | 8/2014 | Besore et al. | |
| 8,863,540 B2 | 10/2014 | Alston et al. | |
| 9,638,436 B2 | 5/2017 | Arensmeier et al. | |
| 2002/0157415 A1 | 10/2002 | Liu | |
| 2006/0130500 A1 | 6/2006 | Gauthier et al. | |
| 2006/0288713 A1 | 12/2006 | Knight et al. | |
| 2008/0173035 A1 | 7/2008 | Thayer et al. | |
| 2008/0184751 A1 | 8/2008 | Olsen et al. | |
| 2009/0277193 A1 | 11/2009 | Springer et al. | |
| 2010/0050756 A1 | 3/2010 | Stewart | |
| 2010/0071868 A1 | 3/2010 | Reifel et al. | |
| 2011/0167846 A1 | 7/2011 | Knight et al. | |
| 2012/0046797 A1 * | 2/2012 | Grohman | F25B 49/02 700/296 |
| 2012/0125592 A1 | 5/2012 | Fadell et al. | |
| 2012/0172027 A1 | 7/2012 | Partheesh et al. | |
| 2012/0228393 A1 | 9/2012 | Storm et al. | |
| 2013/0166075 A1 | 6/2013 | Castillo et al. | |
| 2014/0074730 A1 | 3/2014 | Arensmeier et al. | |
| 2014/0208776 A1 | 7/2014 | Hu et al. | |
| 2014/0262134 A1 | 9/2014 | Arensmeier et al. | |
| 2014/0266755 A1 | 9/2014 | Arensmeier et al. | |
| 2014/0297208 A1 | 10/2014 | Arensmeier | |
| 2014/0337082 A1 | 11/2014 | Nofal | |
| 2015/0027151 A1 * | 1/2015 | Cur | F24F 1/0003 62/117 |
| 2015/0276238 A1 | 10/2015 | Matsuoka et al. | |
| 2015/0323211 A1 | 11/2015 | Abiprojo | |
| 2015/0330650 A1 | 11/2015 | Abiprojo et al. | |
| 2015/0362207 A1 | 12/2015 | Abiprojo et al. | |

* cited by examiner

HEAT PUMP - HEATING MODE

FIG. 4

HEAT PUMP - COOLING MODE

PACKAGED HVAC UNIT WITH SECONDARY SYSTEM CAPABILITY

CROSS-REFERENCE TO RELATED APPLICATION

This application claims the benefit of and priority to U.S. Provisional Application Ser. No. 62/329,020 entitled "PACKAGED HVAC UNIT WITH SECONDARY SYSTEM CAPABILITY" and filed Apr. 28, 2016, the entirety of which is hereby incorporated by reference herein for all purposes.

BACKGROUND

1. Technical Field

The present disclosure relates to air conditioning and heat pump systems and, more particularly, to a climate control system that employs a packaged unit and a split system wherein the packaged system and the split system utilize common components.

2. Background

HVAC systems are typically available as a split system or a packaged system. Split systems utilize an outdoor unit and an indoor unit, whereas packaged systems are all-in-one type units with most of the components for heating and/or cooling housed in a single outdoor cabinet. Packaged systems are popular in certain regions, such as the Southeast, South, and Southwest regions of the United States, where construction techniques favor a single enclosure rather than a split system.

Typically, packaged units are installed outdoors at ground level, in a crawl space, or may be installed on the roof for horizontal or downflow designs. It is common in two story homes to have a packaged unit provide heating and cooling for the downstairs level, and a separate split HVAC system for the upstairs level. Installing two separate systems is an inefficient approach to heating and cooling a two story home, as this approach is costly to install, requires additional equipment, consumes more outdoor space, and increases maintenance costs. In some cases the aesthetic appearance of the two outdoor units does not match, causing customer dissatisfaction.

SUMMARY

In one aspect, the present disclosure is directed to a climate control system for controlling the climate within a primary zone and at least one secondary zone of a building independently. The system includes a primary packaged unit and at least one secondary unit disposed in refrigerant communication with the primary unit. The packaged primary unit includes a primary indoor coil configured for circulating a refrigerant therethrough and a primary variable speed indoor fan configured to propel air through the primary indoor coil for delivery to a primary zone of the building. Each of the at least one secondary unit serves a secondary zone and comprises a secondary indoor coil configured for circulating the refrigerant therethrough and a secondary variable speed indoor fan configured to propel air through the secondary indoor coil for delivery to a secondary zone of the building. The primary unit and the at least one secondary unit shares a common variable speed compressor, an outdoor coil, and an outdoor fan. The compressor, outdoor coil and the outdoor fan are disposed within the primary packaged unit.

In some embodiments, the secondary unit includes an air handling unit. In some embodiments, the secondary unit includes a furnace coil. In some embodiments, the primary unit further includes a reversing solenoid valve disposed between the compressor and the primary indoor coil and between the compressor and the outdoor coil. The reversing valve configured to reverse the flow of refrigerant whereby allowing the primary unit to function as a heat pump and as an air conditioner.

In some embodiments, the at least one secondary zone is disposed above the primary zone, while in other embodiments, the at least one secondary zone is disposed below the primary zone.

In some embodiments, the refrigerant includes a lubricant. In some embodiments, the system is configured to override a current user setting in the event the refrigerant is circulating at a speed inadequate to distribute the lubricant. In some embodiments, the system is further configured to circulate the refrigerant at a higher speed when the primary unit is at a lower elevation than the secondary unit, while in other embodiments, the system is further configured to circulate the refrigerant at a higher speed when the primary unit is at a lower elevation than the secondary unit.

In some embodiments, the system includes a diagnostic database having a plurality of primary and secondary health signatures, each primary health signature representing a pattern indicating the operational state of the primary unit and each secondary health signature representing a pattern indicating the operational state of the secondary unit. The system includes at least one sensor for sensing an operation parameter associated with the primary unit and/or the secondary unit. The system includes a primary diagnostic data collection unit for collecting the sensor data from the primary unit and for converting the primary sensor data into a primary health signature, and a secondary diagnostic data collection unit for collecting the sensor data from the secondary unit and for converting the secondary sensor data into a secondary health signature. The data collection units are configured to verify the primary and secondary heath signatures against the diagnostic database and wherein an alert is issued in the event a mismatch between the signatures indicates a malfunction of the corresponding primary unit, and/or secondary unit.

In another aspect, the present disclosure is directed to a method for controlling the climate within a primary zone and at least one secondary zone of a building independently. The method includes providing a primary packaged unit having a primary indoor coil configured for circulating a refrigerant therethrough and a primary variable speed indoor fan configured to propel air over the primary indoor coil such that the propelled air serves the primary zone of the building. The method includes disposing at least one secondary unit in refrigerant communication with the primary unit, where each of the at least one secondary unit provides a secondary variable speed indoor coil configured for circulating a refrigerant therethrough and a secondary indoor fan configured to propel air through the secondary indoor coil. Each of the at least one secondary unit serves a corresponding secondary zone, such that the propelled air conditions the corresponding secondary zone of the building. The primary unit provides a common variable speed compressor, outdoor coil, and an outdoor fan disposed within an enclosure of the primary unit.

In some embodiments, the method includes disposing an air handling unit in refrigerant communication with the primary unit. In some embodiments, the method includes disposing a furnace coil in refrigerant communication with the primary unit. In some embodiments, the method includes reversing, by a reversing solenoid valve, the flow of the refrigerant to enable the primary unit to function as a heat pump and an air conditioner. In some embodiments, the method includes disposing the at least one secondary zone above the primary zone. In some embodiments, the method includes disposing the at least one secondary zone above the primary zone. In some embodiments, the method includes providing a lubricant with the refrigerant. In some embodiments, the method includes overriding the current user settings to circulate the refrigerant at a higher speed in the event the refrigerant is circulating at a speed inadequate to distribute the lubricant. In some embodiments, the method includes circulating the refrigerant at increased speed in the event the primary unit is disposed at a lower level than the secondary unit.

In some embodiments, the method includes storing a plurality of primary and secondary health signatures within a diagnostic database, each primary health signature representing a pattern indicating the operational status of the primary unit, each secondary health signature representing a pattern indicating the operational status of the secondary unit. The method includes sensing an operational parameter of the primary unit; converting the primary unit sensor data into a primary health signature; sensing an operational parameter of the secondary unit; converting the secondary unit sensor data into a secondary health signature; verifying the converted primary and secondary health signatures against the stored primary and secondary heath signatures within the diagnostic database, and issuing an alert if a mismatch between a converted and a stored signature indicates a malfunction of the corresponding primary unit and/or secondary unit.

Other features and advantages will become apparent from the following description of the preferred embodiments, taken in conjunction with the accompanying drawings.

BRIEF DESCRIPTION OF THE DRAWINGS

Various embodiments of the disclosed system and method are described herein with reference to the accompanying drawings, which form a part of this disclosure, wherein.

The various aspects of the present disclosure mentioned above are described in further detail with reference to the aforementioned figures and the following detailed description of exemplary embodiments.

DETAILED DESCRIPTION

The present disclosure is directed to a climate control system and method employed for installation for a building, which is divided into a primary zone and at least one secondary zone. The system and method enables a user to control the temperatures within the aforementioned zones independently of one another. The system and method employs a single outdoor unit for serving the primary zone and the at least one secondary zone. A primary solenoid valve enables selective flow of refrigerant though a primary zone, and a secondary solenoid valve enables selective flow of refrigerant though a secondary zone. During use, refrigerant may circulate through only the primary zone, only the secondary zone, or through both the primary zone and the secondary zone. The system and method further includes a lubrication distribution aspect to ensure refrigerant-borne lubricant is sufficiently dispersed during operation.

Particular illustrative embodiments of the present disclosure are described hereinbelow with reference to the accompanying drawings; however, the disclosed embodiments are merely examples of the disclosure, which may be embodied in various forms. Well-known functions or constructions and repetitive matter are not described in detail to avoid obscuring the present disclosure in unnecessary or redundant detail. Therefore, specific structural and functional details disclosed herein are not to be interpreted as limiting, but merely as a basis for the claims and as a representative basis for teaching one skilled in the art to variously employ the present disclosure in virtually any appropriately detailed structure. In this description, as well as in the drawings, like-referenced numbers represent elements which may perform the same, similar, or equivalent functions. The word "exemplary" is used herein to mean "serving as an example, instance, or illustration." Any embodiment described herein as "exemplary" is not necessarily to be construed as preferred or advantageous over other embodiments. The word "example" may be used interchangeably with the term "exemplary."

Figure 1:
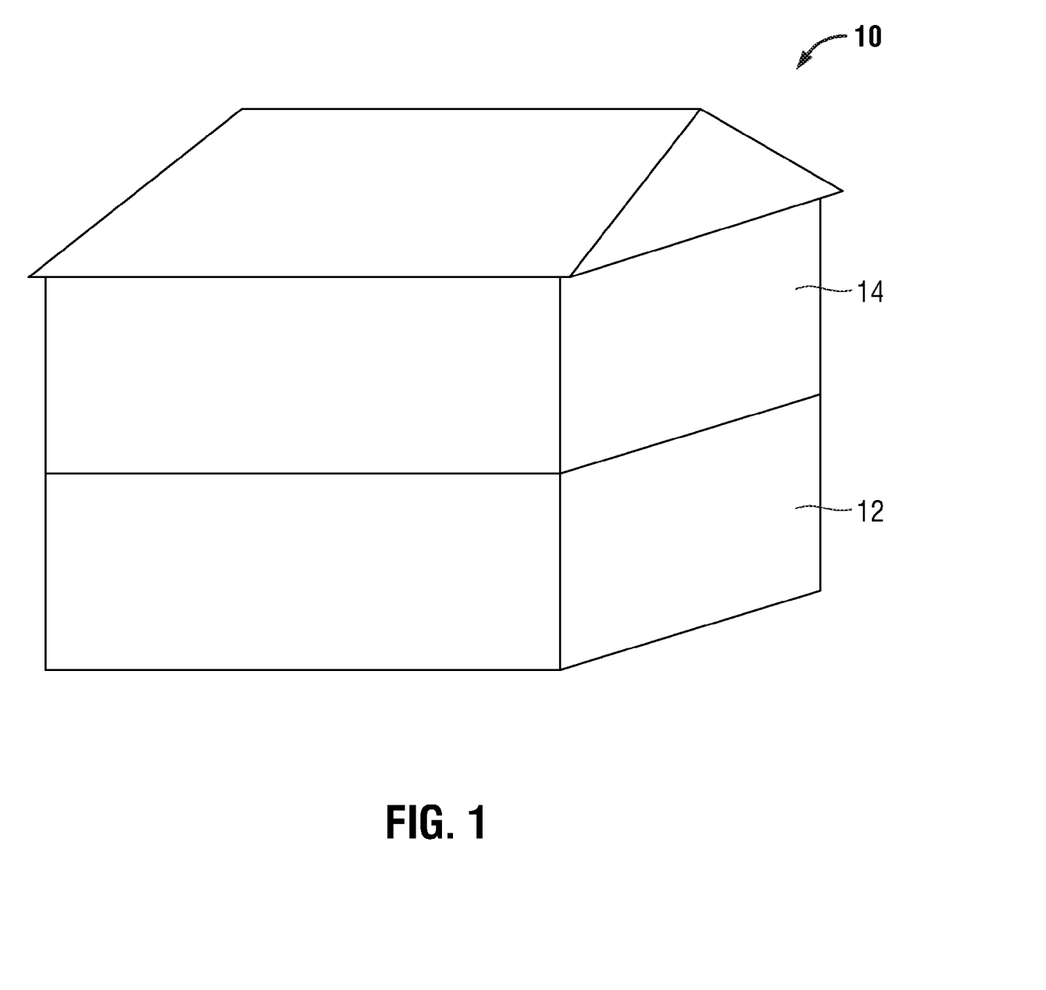
FIG. 1 is an illustration of a building wherein the primary and secondary units are to be installed in accordance with an exemplary embodiment of the present disclosure.
Figure 2:
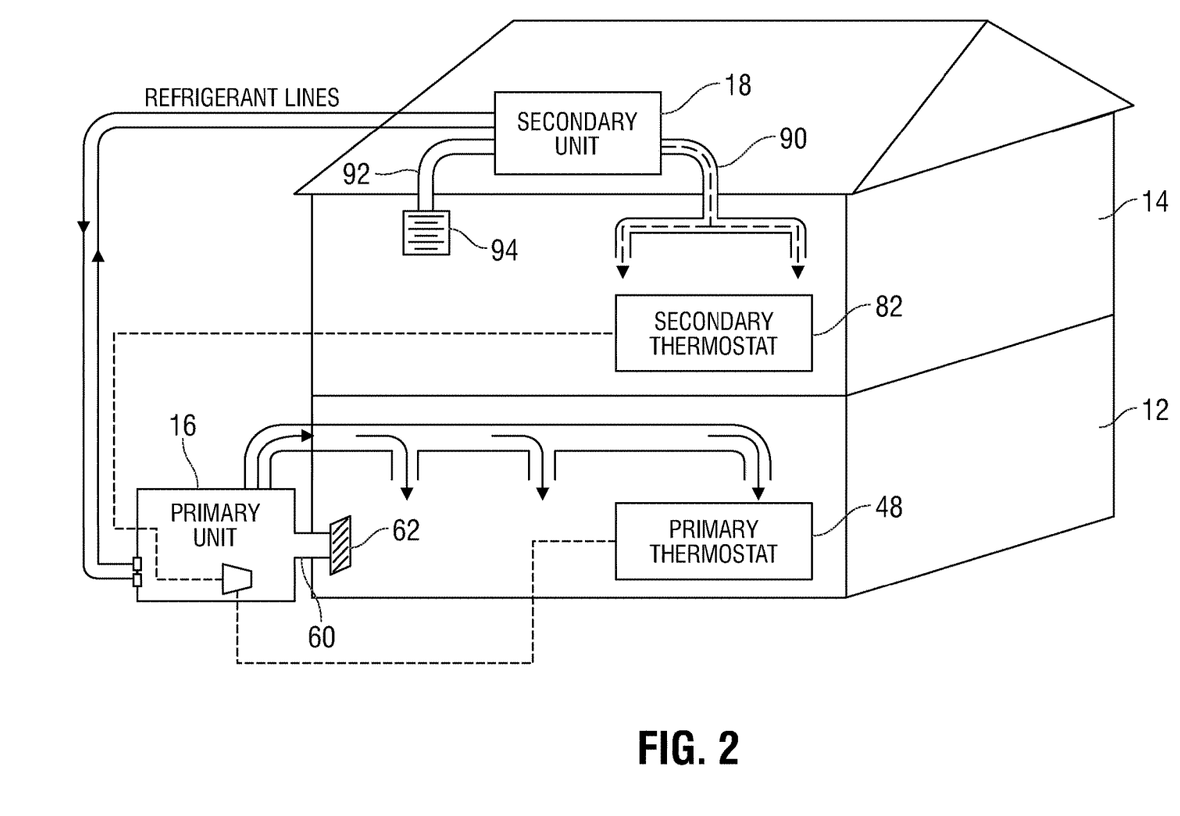
FIG. 2 is an illustration of a building wherein the primary and secondary units are installed in accordance with an exemplary embodiment of the present disclosure.

Referring to FIGS. 1 and 2, an embodiment of the present disclosure includes a climate control system for installation for a building 10, which is divided into various zones, e.g., a primary zone 12 and at least one secondary zone. For ease of understanding, the at least one secondary zone comprises one secondary zone 14. More particularly, the building 10 includes a two story building and the secondary zone 14 is situated above the primary zone 12. That is, the primary zone 12 comprises the ground floor portion of the building 10, whereas the secondary zone 14 comprises the top floor portion of the building 10.

With reference to FIGS. 2-5, the system includes a primary packaged unit 16 employed for the primary zone 12 of the building 10 and a secondary air handling unit 18 (which may include an auxiliary heat source, such as a gas-fired furnace) employed for the secondary zone 14 of the building 10. The primary unit 16, includes a variable speed compressor 20, an outdoor coil 22 accompanied by an outdoor fan 24, a primary indoor coil 26 operatively associated with a primary indoor fan 28, a primary expansion valve 30, and a primary solenoid valve 32. The primary unit 16 further employs reversing solenoid valve 34 whereby the operating mode of operation of primary unit 16 is configurable as a heat pump during colder climatic conditions and as an air conditioner during warmer climatic conditions.

Figure 3:
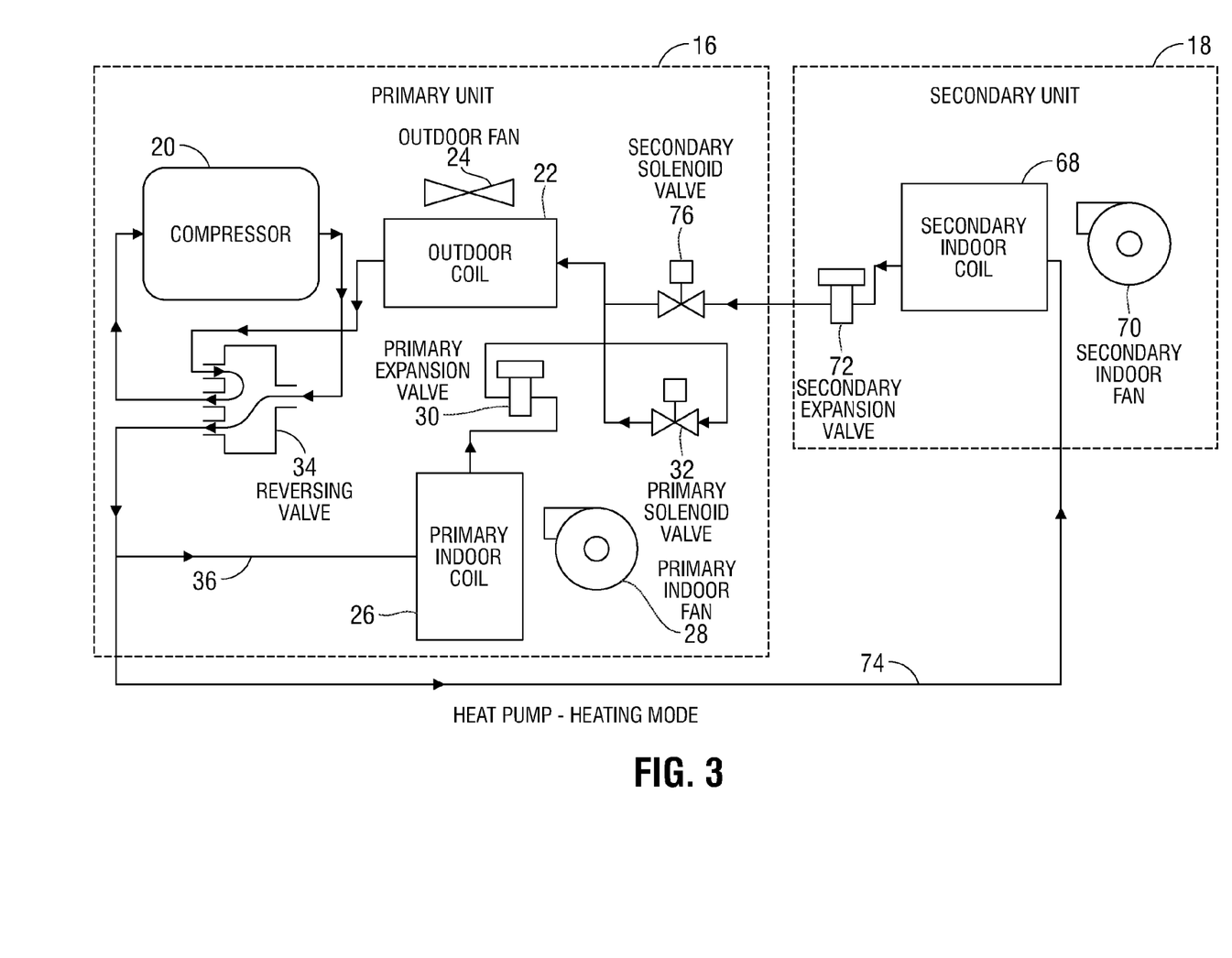
FIG. 3 is a schematic diagram of a climate control system wherein the primary and secondary units are operating in a heat pump mode in accordance with an exemplary embodiment of the present disclosure.

As shown in FIG. 3, the primary unit 16 further comprises a primary refrigerant line 36 for circulating a refrigerant. The primary refrigerant line 36 runs in a loop, initiating from and terminating at compressor 20. As can be appreciated from the drawings, in a heat pump mode of primary unit 16, the primary refrigerant line 36, with regard to refrigerant flow, proceeds from compressor 20 and flows into reversing valve 34, which in heat pump mode directs compressed hot refrigerant to the primary indoor coil 26. Thereafter, the primary refrigerant line 36 conveying the relatively cooler refrigerant, passes through primary expansion valve 30, through primary solenoid valve 32 which is set to allow refrigerant flow therethrough, and flows into the outdoor coil 22 carrying colder refrigerant. In embodiments, primary expansion valve 30 is bypassed in heat pump mode, and/or a corresponding expansion valve (not explicitly shown) is provided at the inlet of outdoor coil 22. The primary refrigerant line 36 carrying the relatively colder refrigerant from the outdoor coil 22 flows through reversing valve 34 in heat pump mode, and terminates at the inlet of compressor 20 and thereafter the cycle repeats. Thus, in the heat pump mode, the primary indoor coil 26 and the outdoor coil 22 function as condenser and evaporator coils respectively.

Referring again to FIG. 4, in the air conditioner mode of the primary unit 16, the primary refrigerant line 36, in terms of refrigerant flow, proceeds from the compressor 20, though reversing valve 34 in cooling mode, and into the outdoor coil 22 carrying compressed hot refrigerant therewithin. Thereafter, the primary refrigerant line 36 conveying the relatively cooler refrigerant, passing via primary solenoid valve 32 and the primary expansion valve 30, flows into the primary indoor coil 26 carrying colder refrigerant. Notably, the refrigerant being subjected to sudden expansion when passing through the primary expansion valve 30 instantaneously and drastically lowers the temperature of the refrigerant. The primary refrigerant line 36 carrying the relatively hotter refrigerant from the primary indoor coil 26 flows through reversing valve 34 in cooling mode and into the compressor 20, and thereafter the vapor-compression cycle repeats. In the air conditioner mode, primary indoor coil 26 and outdoor coil 22 function as evaporator and condenser coils, respectively.

Figure 6:
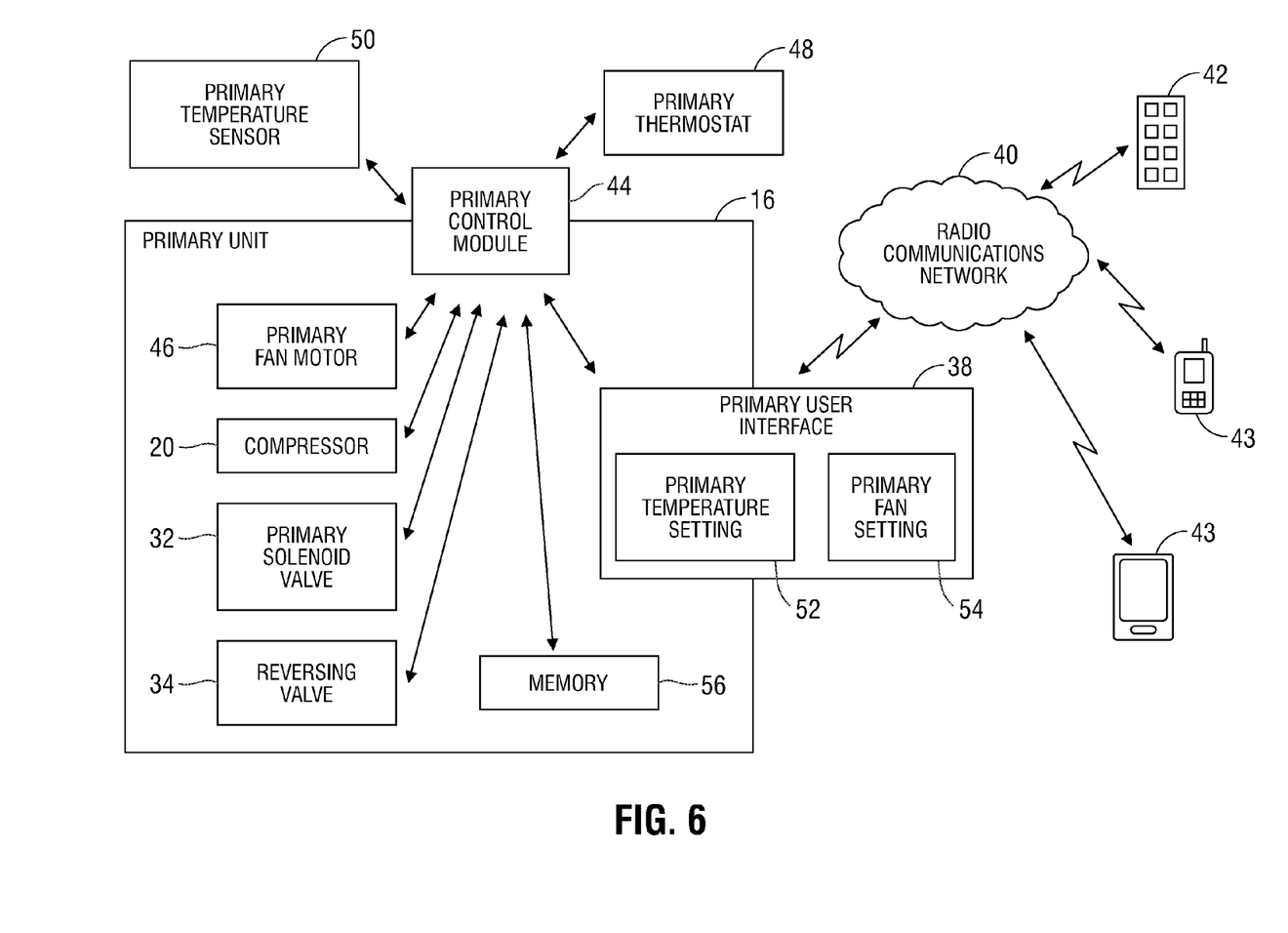
FIG. 6 is a schematic block diagram of a primary unit in accordance with an exemplary embodiment of the present disclosure.

Referring to FIG. 6, the primary unit 16 further comprises a primary user interface 38 for enabling a user to interact therewith over a radio signal afforded by a radio communications network 40. More particularly, the primary user interface 38 is provided by a remote controller device 42 and/or a portable computing device 43 such as a smartphone, tablet PC, etc., whereon corresponding control software ("control app") is installed. The primary unit 16 further comprises a primary control module 44, which is disposed in operative communication with the primary user interface 38 and each of the primary fan motor 46, compressor 20, primary solenoid valve 32, primary thermostat 48, a primary temperature sensor 50, and the reversing valve 34. The primary user interface 38 comprises a primary temperature setting 52 wherein, operating the primary temperature setting 52 results in the primary control module 44 manipulating the primary solenoid valve 32 allowing a desired amount of refrigerant passage therethrough. In some embodiments, primary control module 44 manipulates primary solenoid valve 32 in a binary, e.g., on/off mode. In some embodiments, primary control module 44 manipulates primary solenoid valve 32 in a continuously variable flow mode. This, in turn, leads to the manipulation of the output temperature from the primary unit 16. Further, the primary control module 44, as enabled by the primary thermostat 48, is configured to turn off the primary solenoid valve 32 in the event of the temperature of the primary zone, as sensed by the primary temperature sensor 50, is at the desired temperature as indicated by the primary temperature settings 52. The primary solenoid valve 32 is turned back on in the event of the temperature of the primary zone, as sensed by the primary temperature sensor 50, goes beyond a predetermined corresponding temperature range. Notably, the desired temperature values and the associated temperature ranges thereof are maintained within a memory 56, which is disposed in operative communication with the primary control module 44. The primary user interface 38 further comprises a primary fan setting 54 wherein, operating the primary fan setting 54 results in the primary control module 44 manipulating the primary fan motor 46 leading to the manipulation of the speed of the primary indoor fan 28. As can be appreciated from FIG. 2, the primary unit 16 further comprises primary ingress ducts 58 for the conveyance of the air blown by the primary indoor fan via one or more primary ingress vents. The primary unit further comprises a primary egress duct 60 for receiving the air within the primary zone via one or more primary egress vents 62. The primary ingress and egress ducts facilitate the circulation of air within the primary zone 12.

Figure 8:
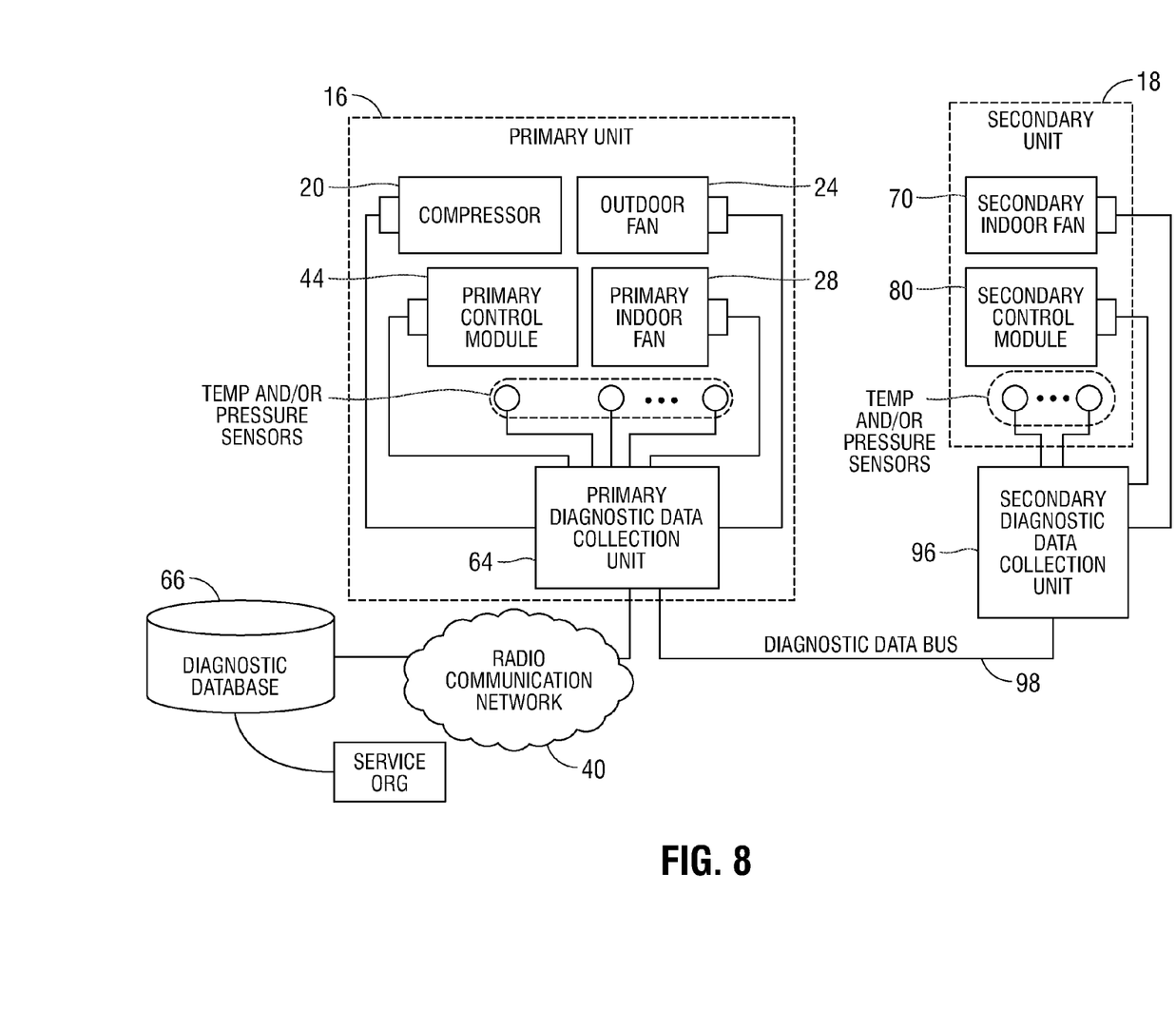
FIG. 8 is a schematic block diagram of primary and secondary units illustrating a diagnostic aspect of the system in accordance with an exemplary embodiment of the present disclosure.

Referring to FIG. 8, the primary unit further comprises a primary diagnostic data collection unit 64, which is disposed in operative communication with a diagnostic database 66 over a radio communications network 40, such as, without limitation, the Internet. The primary data collection unit 64, in real time, receives the temperature and pressure data from temperature and pressure sensors 68 that are configured to monitor operational parameters of the primary indoor fan 28, outdoor fan 24, suction (inlet) and discharge (outlet) ports of compressor 20. Primary data collection unit 64 also receives, in real time, operational parameters relating to compressor 20, such as, without limitation, speed, load, input current, input voltage, and/or input power. Based on the sensor data received, the primary data collection unit 64 formulates a health signature, which is verified against the signatures disposed within the diagnostic database 66. In the event of the heath signature indicating a malfunction, an appropriate command, such as, a shutdown command, is delivered to the primary control module, which in turn shuts down either the entire system or the primary unit 16. A diagnostic server, diagnostic modules, a dedicated diagnostic data bus, and a diagnostic database for use with an HVAC system are disclosed in co-owned U.S. Utility patent application Ser. No. 15/006,651, filed Jan. 26, 2016, entitled "Remote Monitoring of an HVAC System for Fault Detection and Diagnostics" and in co-owned U.S. Utility patent application Ser. No. 15/006,584, filed Jan. 26, 2016, entitled "Diagnostic Data Bus for Acquiring and Communicating Diagnostic Information from HVAC Systems," the entirety of each which is hereby incorporated herein by reference.

Figure 4:
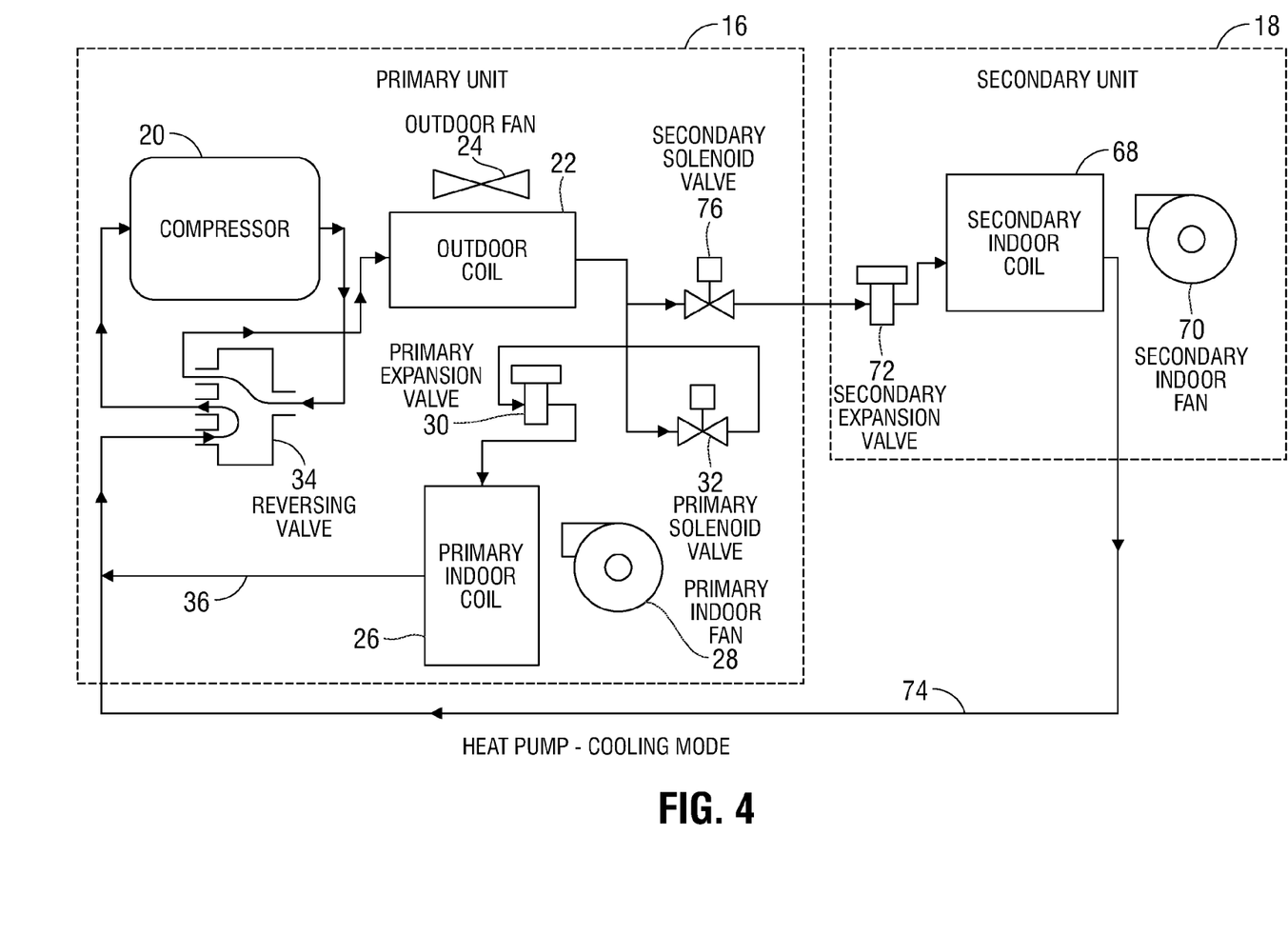
FIG. 4 is a schematic diagram of a climate control system wherein the primary and secondary units are operating in an air conditioning mode in accordance with an exemplary embodiment of the present disclosure.
Figure 5:
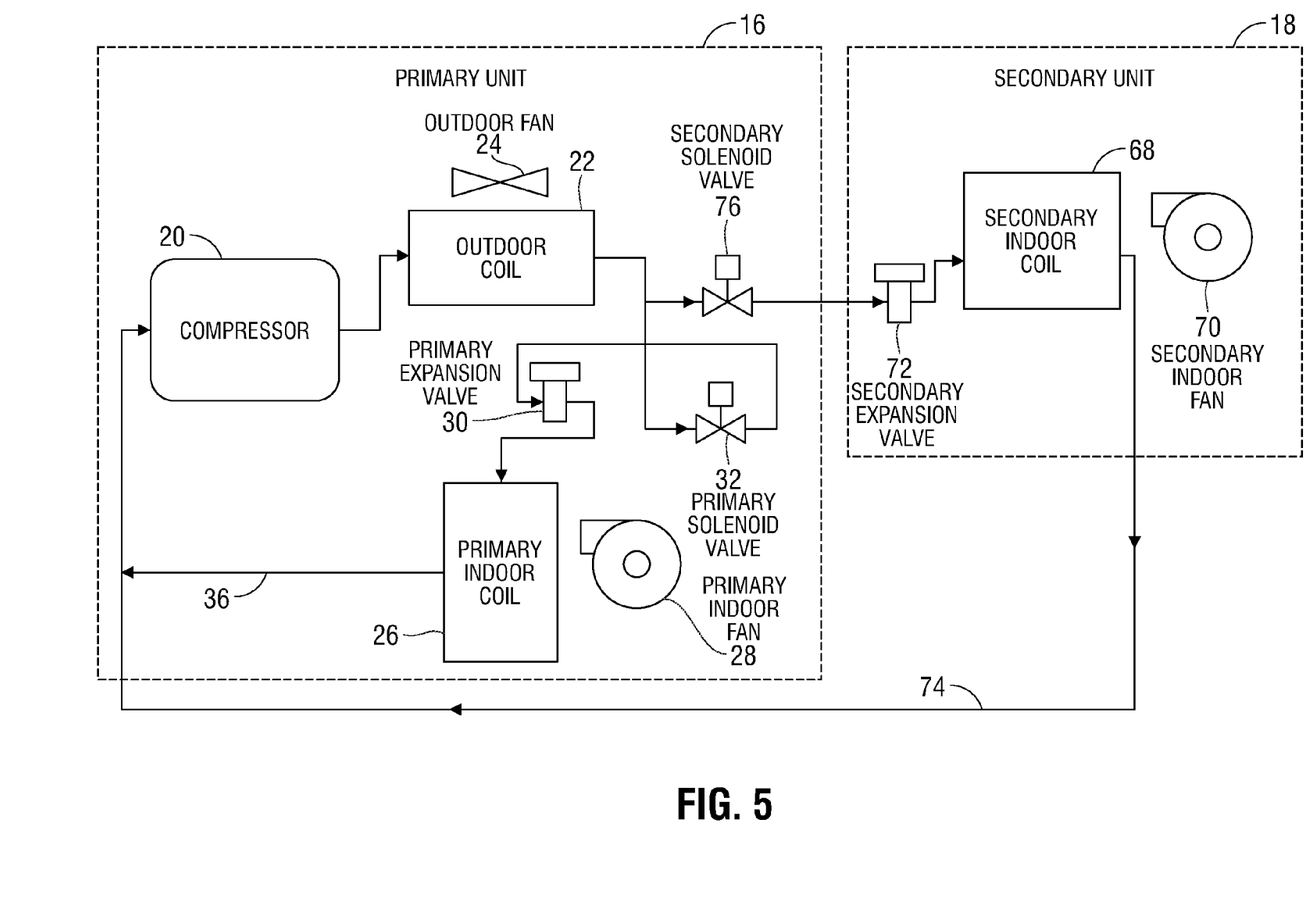
FIG. 5 is a schematic diagram of a climate control system wherein the primary and secondary units are operating in an air conditioning mode in accordance with another exemplary embodiment of the present disclosure.

Referring to FIGS. 1 and 4, the secondary unit 18 comprises a secondary indoor coil 68 accompanied by a secondary indoor fan 70, a secondary expansion valve 72, a secondary refrigerant line 74, and a secondary solenoid valve 76. The system is configured such that, the primary and secondary units 16 and 18 share a common compressor 20, outdoor coil 22, outdoor fan 24, a reversing valve 34, refrigerant, and memory 56. The system is configured such that, both the primary and secondary units 16 and 18, at any given time, operate in either a heat pump mode or an air conditioner mode.

Referring to FIG. 3, the secondary refrigerant line 74 for the secondary unit 18, in the heat pump mode, with respect to refrigerant flow, flows from compressor 20 through reversing valve 34 in heating mode, branches off from the primary refrigerant line 36 and proceeds into the secondary unit 18, which may be include an air handling unit or furnace coil. Within secondary unit 18, the secondary refrigerant line 74 flows into a secondary indoor coil 68. The secondary refrigerant line 74 thereafter proceeds from the secondary indoor coil 68 through secondary expansion valve 72, through secondary solenoid valve 76 that is set to enable refrigerant flow therethrough, and merges into the primary refrigerant line 36 prior to refrigerant line 36 flowing into the outdoor coil 22. Notably, in the heat pump (heating) mode, if the secondary zone calls for heat, secondary solenoid valve 76 is opened and secondary indoor coil 68 acts as a condenser coil. Conversely, if in the heat pump mode the secondary zone is not calling for heat, then secondary solenoid valve 76 is closed thereby deactivating secondary indoor coil 68 (e.g., secondary indoor coil 68 acts as neither a condenser nor an evaporator). Similarly, in the heat pump mode, if the primary zone calls for heat, primary solenoid valve 32 is opened and primary indoor coil 26 acts as a condenser coil. Conversely, if in the heat pump mode the primary zone is not calling for heat, then primary solenoid valve 76 is closed thereby deactivating primary indoor coil 26 (e.g., primary indoor coil 68 acts as neither a condenser nor an evaporator). If both the primary zone and secondary zone call for heat, both primary solenoid valve 32 and secondary solenoid valve 76 are opened, causing both primary indoor coil 26 and secondary indoor coil 68 to act as condensers.

Referring to FIG. 4, on the other hand, the secondary refrigerant line 74 for the secondary unit 18, in the air conditioner mode thereof, in terms of the refrigerant flow, branches off from the primary refrigerant line 36 right post the outdoor coil 22 and proceeds into the air handling unit (or furnace coil) via the secondary solenoid valve 76 and the secondary expansion valve 72 in that order. Within the air handling unit, the secondary refrigerant line 74 flows into a secondary indoor coil 68. The secondary refrigerant line 74, thereafter, proceeds from the secondary indoor coil 68 and merges into the primary refrigerant line 36 prior to reversing valve 34. Notably, in the air conditioner (cooling) mode, if the secondary zone calls for cooling, secondary solenoid valve 76 is opened and secondary indoor coil 68 acts as an evaporator coil. Conversely, if in the cooling mode the secondary zone is not calling for cooling, then secondary solenoid valve 76 is closed thereby deactivating secondary indoor coil 68 (e.g., secondary indoor coil 68 acts as neither a condenser nor an evaporator). Similarly, in the cooling mode, if the primary zone calls for cooling, primary solenoid valve 32 is opened and primary indoor coil 26 acts as an evaporator coil. Conversely, if in the cooling mode the primary zone is not calling for cooling, then primary solenoid valve 76 is closed thereby deactivating primary indoor coil 26 (e.g., primary indoor coil 68 acts as neither a condenser nor an evaporator). If both the primary and secondary zones call for cooling, both primary solenoid valve 32 and secondary solenoid valve 76 are opened, causing both primary indoor coil 26 and secondary indoor coil 68 to act as evaporators.

Figure 7:
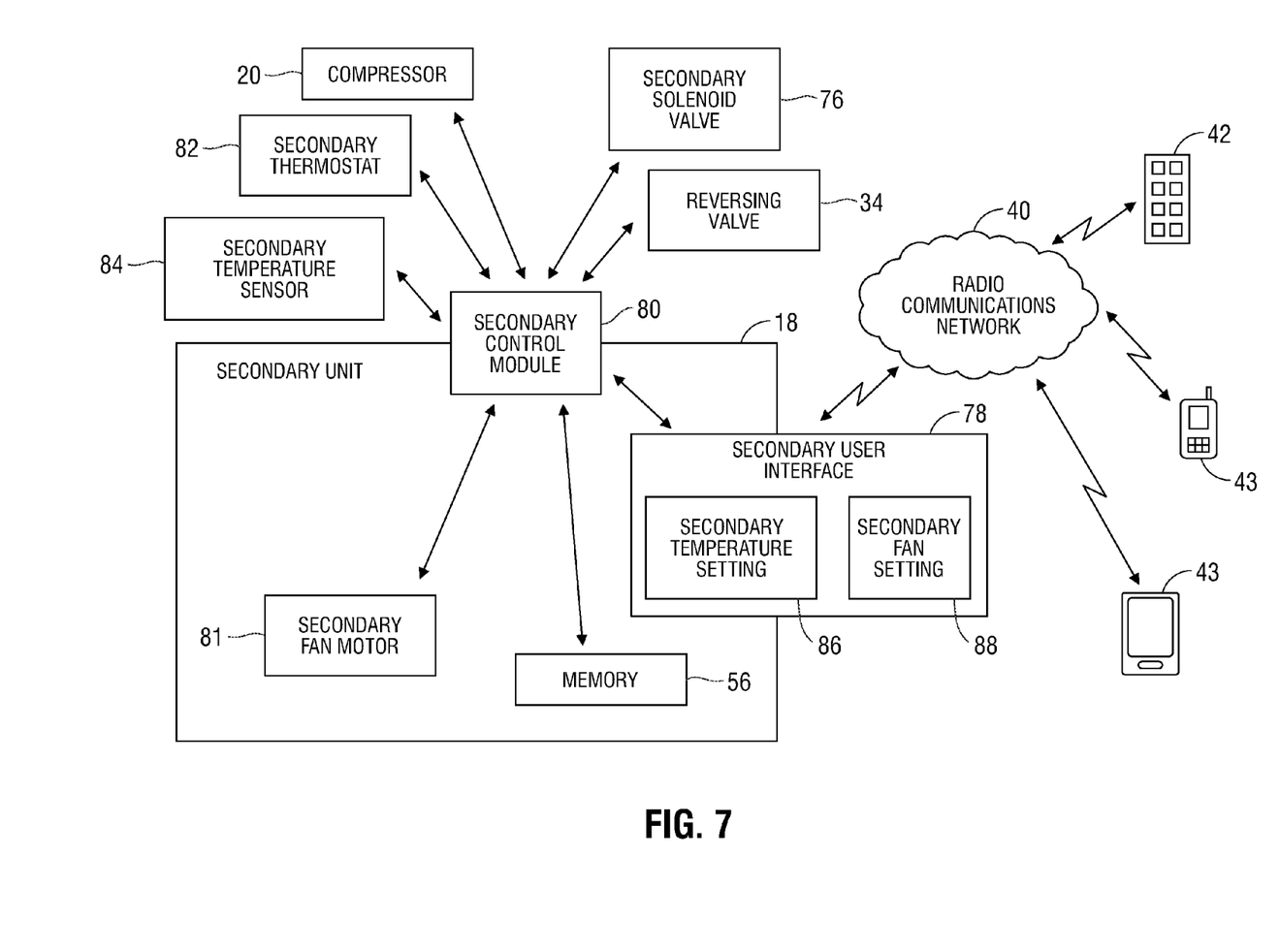
FIG. 7 is a schematic block diagram of a secondary unit in accordance with an exemplary embodiment of the present disclosure.

Still referring to FIGS. 4 and 7, the secondary unit 18 further comprises a secondary user interface 78 for enabling a user to interact therewith over a radio signal afforded by a radio communications network 40. More particularly, the secondary user interface 78 is provided by a remote controller device 42 or even a portable computing device 43 such as, a smartphone, tablet PC, etc., whereon a control app is installed. The secondary unit 18 further comprises a secondary control module 80, which is disposed in operative communication between the secondary user interface 78 and each of the secondary fan motor 81, compressor 20, secondary solenoid valve 76, secondary thermostat 82, a secondary temperature sensor 84, and the reversing valve 34. The secondary user interface 78 comprises a secondary temperature setting 84, wherein operating the secondary temperature setting 84 results in the secondary control module 80 manipulating the secondary solenoid vale 76 allows a desired amount of refrigerant passage therethrough. This, in turn, enables modulation of the output temperature from the secondary unit 18. Further, the secondary control module 80, as enabled by the secondary thermostat 82, is configured to turn off the secondary solenoid valve 76 in the event of the temperature of the secondary zone 14, as sensed by the secondary temperature sensor 84, is at the desired temperature as indicated by the secondary temperature settings 86. The secondary solenoid valve 76 is turned back on in the event of the temperature of the secondary zone 14, as sensed by the secondary temperature sensor 84, goes beyond a predetermined corresponding temperature range. Notably, the desired temperature values and the associated temperature ranges thereof are maintained within a memory 56, which is disposed in operative communication with the secondary control module 80. The secondary user interface 78 further comprises a secondary fan setting 88 wherein, operating the secondary fan setting 88 results in the secondary control module 80 manipulating the secondary fan motor 81 leading to the manipulation of the speed of the secondary indoor fan 70. In one embodiment, the system is configured such that, the secondary unit 18 can be manipulated or shut down from the secondary user interface 78 and vice versa. As can be appreciated from FIG. 2, the secondary unit further comprises secondary ingress ducts 90 for the conveyance of the air blown by the secondary indoor fan 70 via one or more secondary ingress vents. The secondary unit 18 further comprises a secondary egress duct 92 for receiving the air within the secondary zone 14 via one or more secondary egress vents 94. The secondary ingress and egress ducts for facilitating the circulation of air within the secondary zone 14. In some embodiment, as can be appreciated from FIG. 5, the primary and secondary units serve 16 and 18 only as air conditioning units. In some embodiments, the functions of the primary control module 44 or the secondary control module 80 may be included in the other, e.g., combined into a single control module.

Referring to FIG. 8, the secondary unit 18 further comprises a secondary diagnostic data collection unit 96, which is disposed in operative communication with the diagnostic database 66 over a radio communications network 40 such as the Internet. The secondary collection unit 96, in real time, receives the temperature and/or pressure data from temperature and/or pressure sensors that are employed for the benefit of the secondary indoor fan 70 and the processor of the secondary control module 80. Based on the sensor data received, the secondary collection unit 96 formulates a health signature, which is verified against the signatures disposed within the diagnostic database 66 pertaining to the secondary indoor fan 70 and the secondary control module 80. The primary and secondary data collection units 64 and 96 communicate with the diagnostic database 66 via a diagnostic data bus 98. In the event of one of or both heath signatures indicating a malfunction, an appropriate command, such as, a shutdown command, is delivered to the secondary control module 80, which in turn shuts the either the entire system down or just the secondary unit 18 down.

Referring to FIGS. 2, 6 and 7, in one embodiment, the refrigerant is mixed with an oil lubricant whereby, the lubricant maintains the components of the primary and secondary units 16 and 18 as the refrigerant passes through the primary and secondary refrigerant lines 36 and 74. In one embodiment, in an event where, the refrigerant is running at a lower speed than required to ensure adequate circulation of lubricant and/or when periodic maintenance is needed, the system is configured to override the primary and secondary temperature settings 52 and 86 for a predetermined period of time allowing for the refrigerant to run at a higher speed and thereby ensuring that system components are properly lubricated. In one embodiment, the system, by factoring in gravity, is configured to run the refrigerant at a higher speed if the primary unit is placed on the ground (as opposed to being elevated).

Figure 9:
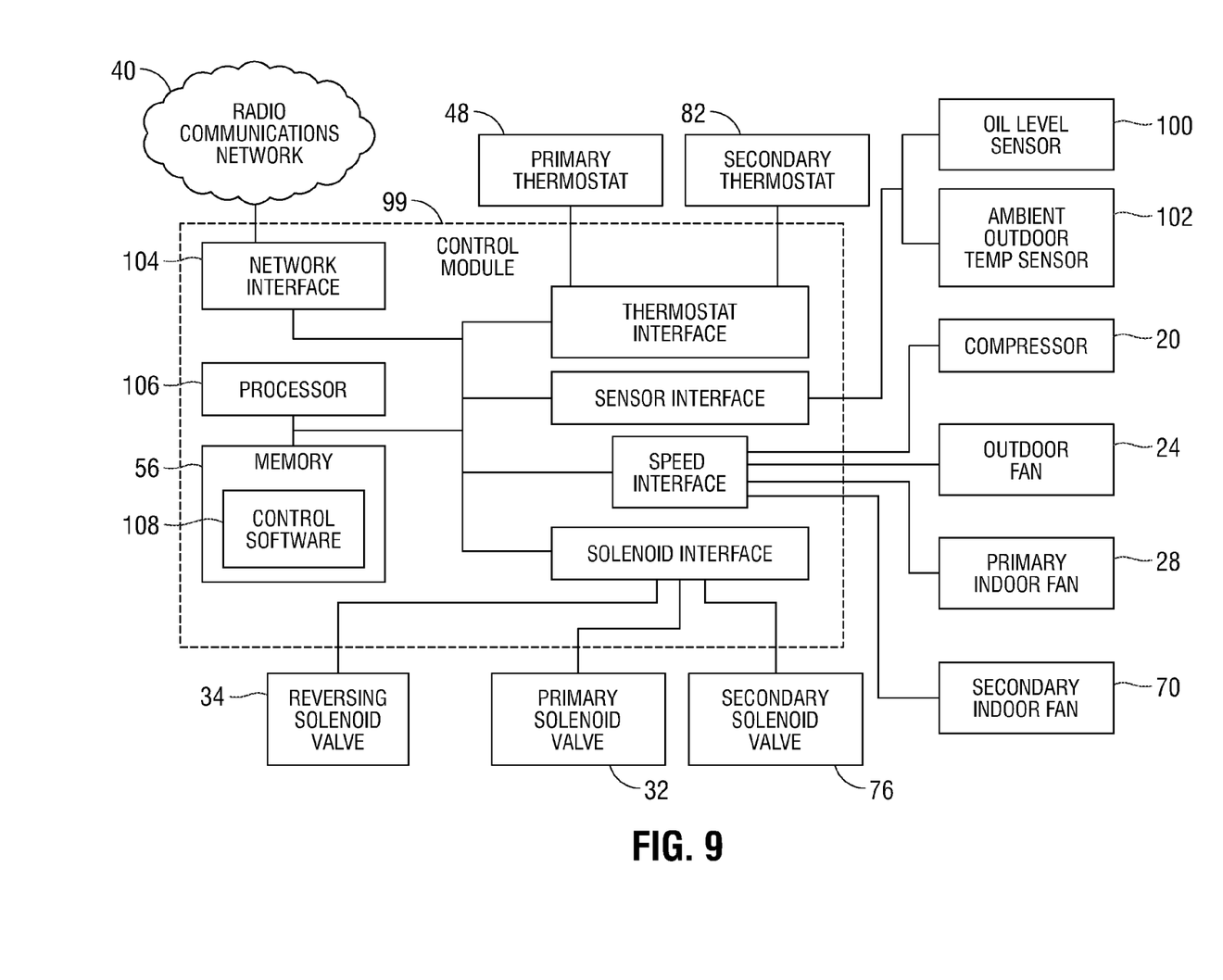
FIG. 9 is a schematic block diagram of a control module in accordance with an exemplary embodiment of the present disclosure.

Referring to FIG. 9, the primary and secondary control modules, which will collectively be referred to as control module 99, comprises aforesaid memory 56 and a processor 106 for executing a plurality of computer instructions included in control software 108 residing within the memory 56. The control module 99 comprises a thermostat interface, which is disposed in constant operative communication with the primary and secondary thermostats 48 and 82. In the similar manner, the control module comprises a sensor interface, which is disposed in constant operative communication with an oil level sensor 100 and an ambient outdoor temperature sensor 102. When it is determined by the oil level sensor 100 that the oil is below a predetermined level, the processor 106, as per the instructions laid out by the control software 108, issues either an exemplary visual or aural alert. When the temperature sensed by the outdoor temperature sensor 102 exceeds a predetermined temperature range, indicating an overheating situation, the processor 106, in accordance with the instructions included in control software 108, shuts down the primary, secondary, or both units. Alternatively, the processor 106 may lower the speed of the outdoor fan 24 via a speed interface included within control module 99. As can be appreciated, the speed interface is also disposed in operative communication with the compressor 20 and the primary and secondary indoor fans 28 and 70. Further, the control module 99 comprises a solenoid interface, disposed in operative communication with the primary and secondary solenoid valves 32 and 76 and the reversing solenoid valve 34 wherein, the processor controls the solenoid valves via the solenoid interface in accordance with the control software 108 to selectively enable primary unit 16 and secondary unit 18, and to select heating or air conditioning mode, respectively. The control module 99 further comprises a network interface 104 for interacting with external devices, such as the aforementioned diagnostic database 66 (FIG. 8) over the radio communications network 40.

Another aspect of the present disclosure discloses a climate control method, which is employed for a building, which is divided into various zones, e.g., a primary zone and at least one secondary zone. For ease of understanding, the at least one secondary zone comprises one secondary zone. More particularly, the building comprises a two story building and the secondary zone is disposed over the primary zone. In other words, the primary zone comprises the ground floor portion of the building and the secondary zone comprises the top floor portion of the building. However, it should be understood that embodiments of the present invention may be arranged in any suitable configuration. For example, as typically seen in a commercial application, primary unit 16 may be positioned on a rooftop, and secondary unit 18 serves a space positioned below primary unit 16. In an alternative arrangement, primary unit 16 is configured to deliver cooling and/or heating to a primary zone in the structure (e.g., factory floor, warehouse, main office area, and the like), and secondary unit 18 is configured to deliver cooling and/or heating to a secondary zone in the structure (e.g., break room, restroom area, lobby, and so forth).

The method initiates with disposing a primary packaged unit for the primary (ground floor) zone of the building and disposing a secondary unit comprising an air handling unit or furnace coil in refrigerant communication with the primary unit, wherein the secondary unit is employed for the secondary (upstairs) zone of the building. The primary unit, which comprises a typical packaged unit, comprises a variable speed compressor, an outdoor coil accompanied by an outdoor fan, a primary indoor coil accompanied by a primary indoor fan, a primary expansion valve, a primary refrigerant line, a primary solenoid valve, and a secondary solenoid valve. The secondary unit comprises a secondary indoor coil accompanied by a secondary indoor fan, a secondary expansion valve, and a secondary refrigerant line. The system is configured such that, the primary and secondary units share a common compressor, outdoor coil, outdoor fan, refrigerant, and memory. The method more particularly comprises disposing the secondary unit in refrigerant communication with the primary unit such that, both the primary and secondary units share a common variable speed compressor, outdoor coil, and an outdoor fan. The primary unit further employs reversing solenoid valve whereby, the primary unit and thereby the secondary unit is employed as a heat pump during colder climatic conditions and as an air conditioner during hotter climatic conditions.

The method further comprises reversing the direction of the refrigerant flow by employing a reversing valve within the primary unit. The reversing valve is adapted to interface between the compressor and the primary indoor coil and the between the compressor and the outdoor coil. More particularly, the primary unit further comprises a primary refrigerant line for circulating a refrigerant. The primary refrigerant line, which circulates in a loop, initiates from and terminates at the compressor. As can be appreciated from the referred drawings, the primary refrigerant line, with respect to refrigerant flow, in the heat pump mode of the primary unit, proceeds from the compressor, where the refrigerant is subjected to compression. Thereafter, the primary refrigerant line flows into the primary indoor coil carrying compressed hot refrigerant therewithin. Thereafter, the primary refrigerant line conveys the relatively cooler refrigerant, passing via a primary expansion valve and the primary solenoid valve, into the outdoor coil carrying colder refrigerant. The primary refrigerant line carrying the relatively colder refrigerant from the outdoor coil terminates into the compressor and thereafter the cycle repeats. The secondary refrigerant line for the secondary unit, in the heat pump mode thereof, with regard to refrigerant flow, branches from the primary refrigerant line beyond the reversing valve and proceeds into the air handling unit or the furnace coil. Within the air handling unit, the secondary refrigerant line flows into a secondary indoor coil. The secondary refrigerant line, thereafter, proceeds from the secondary indoor coil and merges into the primary refrigerant line right before the primary refrigerant line flows into the outdoor coil. Notably, the second refrigerant line passes via the secondary expansion valve and the secondary solenoid valve before the merge. Notably, as known in the art, in the heat pump mode, the primary and secondary indoor coils, and the outdoor coil, act as condenser and evaporator coils respectively.

The primary refrigerant line, in terms of the refrigerant flow, in the air conditioner mode of the primary unit, is subjected to compression by the compressor. Thereafter, the primary refrigerant line flows into the outdoor coil carrying compressed hot refrigerant therewithin. Thereafter, the primary refrigerant line conveys the relatively cooler refrigerant, passing via primary solenoid valve and the primary expansion valve, into the primary indoor coil carrying colder refrigerant. Notably, the refrigerant being subjected to sudden expansion when passing through the primary expansion valve instantaneously and drastically brings down the temperature of the refrigerant. The primary refrigerant line conveys the relatively hotter refrigerant from the primary indoor coil terminates into the compressor and thereafter the cycle repeats. The secondary refrigerant line for the secondary unit, in the air conditioner mode thereof, in terms of the refrigerant flow, branches off from the primary refrigerant line right post the outdoor coil and proceeds into the air handling unit (or the heat furnace) via the secondary solenoid valve and the secondary expansion valve in that order. Within the air handling unit, the secondary refrigerant line flows into a secondary indoor coil. The secondary refrigerant line, thereafter, proceeds from the secondary indoor coil and merges into the primary refrigerant line prior to the point at which the primary refrigerant line interfaces with the reversing valve. Notably, as known in the art, in the air conditioner mode, the primary and secondary indoor coils, and the outdoor coil, act as evaporator and condenser coils, respectively.

The method further comprises setting, as enabled by a primary temperature setting, a desired temperature for the primary zone, wherein the primary temperature setting is a part of the primary unit. This is achieved by providing a primary user interface for enabling a user to interact therewith over a radio signal afforded by a radio communications network. More particularly, the primary user interface is proved by a remote controller device or portable computing device such as, a smartphone, tablet PC, etc., whereon a controller app is installed. The method further comprises disposing a primary control module in operative communication between the primary user interface and each of the primary fan motor, compressor, primary solenoid valve, primary thermostat, a primary temperature sensor, and the reversing valve. For the secondary unit, the method similarly comprises setting, as enabled by a secondary temperature setting, a desired temperature for the secondary zone wherein, the secondary temperature setting is a part of the secondary unit. This is accomplished by providing a secondary user interface for enabling a user to interact therewith over a radio signal afforded by a radio communications network. More particularly, the secondary user interface is provided by a remote controller device or portable computing device such as, a smartphone, tablet PC, etc., whereon the controller app is installed. The method further comprises disposing a secondary control module in operative communication between the secondary user interface and each of the secondary indoor fan motor, compressor, secondary solenoid valve, secondary thermostat, a secondary temperature sensor, and the reversing valve.

The method further comprises turning off, as enabled by the primary thermostat, the primary solenoid valve in the event of the temperature of the primary zone is, as sensed by the primary temperature sensor, at the desired temperature as indicated by the primary temperature settings. The method further comprises turning the primary solenoid valve back on in the event of the temperature of the primary zone, as sensed by the primary temperature sensor, goes beyond a predetermined corresponding temperature range. Notably, the desired temperature values and the associated temperature ranges thereof are maintained within a memory, which is disposed in operative communication with the control module. The primary user interface further comprises a primary fan setting, wherein operating the primary fan results in the primary control module manipulating the primary indoor fan motor and, therefore, manipulation of the speed of the primary indoor fan. The method further comprises turning off, as enabled by the secondary thermostat, the secondary solenoid valve in the event of the temperature of the secondary zone being, as sensed by the secondary temperature sensor, at the desired temperature as indicated by the secondary temperature settings. The method further comprises turning the secondary solenoid valve back on in the event of the temperature of the secondary zone, as sensed by the secondary temperature sensor, going beyond a predetermined corresponding temperature range. Notably, the desired temperature values and the associated temperature ranges thereof are listed within a memory, which is disposed in operative communication with the secondary control module. The secondary user interface further comprises a secondary fan setting wherein, operating the secondary fan setting results in the secondary control module manipulating the motor of the secondary indoor fan leading to the manipulation of the speed of the secondary indoor fan. The primary and secondary unit further comprises a primary and secondary ingress ducts for the conveyance of the air blown by the primary and secondary indoor fans respectively via one or more primary and secondary ingress vents respectively. The primary and secondary units further comprise primary and secondary egress ducts respectively for receiving the air within the primary and secondary zones respectively via one or more primary and secondary egress vents respectively. The primary and secondary ingress and egress ducts for facilitating the circulation of air within the primary and secondary zones respectively.

The method further comprises regulating, as enabled by the primary and secondary solenoid valves, the refrigerant flow in accordance with the primary and secondary temperature settings respectively. More particularly, the primary and secondary user interfaces comprise the aforementioned primary and secondary temperature setting respectively wherein, operating the primary and secondary temperature settings results in the primary and secondary control modules respectively manipulating the primary and secondary solenoid valves allowing a desired amount of refrigerant passage therethrough. This, in turn, leads to the manipulation of the output temperature from the primary and secondary units.

In one embodiment, the method comprises mixing the refrigerant with a lubricant, such as oil, whereby, the lubricant is circulated to the components of the primary and secondary units as the refrigerant passes through the primary and secondary refrigerant lines. In one embodiment, in an event where the refrigerant is running at a lower speed necessary to maintain adequate lubrication, or when periodic maintenance is needed, the method comprises overriding the primary and secondary temperature settings for a predetermined period of time allowing for the refrigerant to run at a higher speed and thereby allowing the lubricant to carry out the maintenance thereof. In one embodiment, in the event of the primary unit being placed on the ground (as opposed to being elevated), the method comprises running the refrigerant at a higher speed by factoring in the gravity.

Aspects

It is noted that any of aspects 1-11 and/or any of aspects 12-21 may be combined with each other in any combination.

Aspect 1. A climate control system for controlling the climate within a primary zone and at least one secondary zone of a building independently, the system comprising a primary packaged unit and at least one secondary unit disposed in refrigerant communication with the primary unit; the packaged primary unit comprises a primary indoor coil configured for circulating a refrigerant therethrough and a primary variable speed indoor fan configured to propel air through the primary indoor coil for delivery to a primary zone of the building; each of the at least one secondary unit serves a secondary zone and comprises a secondary indoor coil configured for circulating the refrigerant therethrough and a secondary variable speed indoor fan configured to propel air through the secondary indoor coil for delivery to a secondary zone of the building, wherein the primary unit and the at least one secondary unit shares a common variable speed compressor, an outdoor coil, and an outdoor fan, and wherein the compressor, outdoor coil and the outdoor fan are disposed within the primary packaged unit.

Aspect 2. The system in accordance with aspect 1, wherein the secondary unit comprises an air handling unit.

Aspect 3. The system in accordance with any of aspects 1-2, wherein the secondary unit comprises a furnace coil.

Aspect 4. The system in accordance with any of aspects 1-3, wherein the primary unit further comprises a reversing solenoid valve disposed between the compressor and the primary indoor coil and between the compressor and the outdoor coil; the reversing valve configured to reverse the flow of refrigerant whereby allowing the primary unit to function as a heat pump and as an air conditioner.

Aspect 5. The system in accordance with any of aspects 1-4, wherein the at least one secondary zone is disposed above the primary zone.

Aspect 6. The system in accordance with any of aspects 1-5, wherein the at least one secondary zone is disposed below the primary zone.

Aspect 7. The system in accordance with any of aspects 1-6, wherein the refrigerant includes a lubricant.

Aspect 8. The system in accordance with any of aspects 1-7, further configured to override a current user setting thereof in the event the refrigerant is circulating at a speed inadequate to distribute the lubricant.

Aspect 9. The system in accordance with any of aspects 1-8, further configured to circulate the refrigerant at a higher speed when the primary unit is at a lower elevation than the secondary unit.

Aspect 10. The system in accordance with any of aspects 1-9, further configured to circulate the refrigerant at a higher speed when the primary unit is at a lower elevation than the secondary unit.

Aspect 11. The system in accordance with any of aspects 1-10, further comprising a diagnostic database comprising a plurality of primary and secondary health signatures, each primary health signature representing a pattern indicating the well being of the primary unit, each secondary health signature representing a pattern indicating the well being of the secondary unit, at least one sensor for sensing an operation parameter associated with the primary unit and/or the secondary unit, and a primary diagnostic data collection unit for collecting the sensor data from the primary unit and for converting the primary sensor data into a primary health signature, a secondary diagnostic data collection unit for collecting the sensor data from the secondary unit and for converting the secondary sensor data into a secondary health signature, wherein the data collection units are configured to verify the primary and secondary heath signatures against the diagnostic database and wherein an alert is issued in the event a mismatch between the signatures indicates a malfunction of the corresponding primary unit, and/or secondary unit.

Aspect 12. A method for controlling the climate within a primary zone and at least one secondary zone of a building independently, the method comprising providing a primary packaged unit having a primary indoor coil configured for circulating a refrigerant therethrough and a primary variable speed indoor fan configured to propel air over the primary indoor coil, the blown air serving the primary zone of the building; and disposing at least one secondary unit in refrigerant communication with the primary unit, each of the at least one secondary unit comprising a secondary variable speed indoor coil configured for circulating a refrigerant therethrough and a secondary indoor fan configured to propel air through the secondary indoor coil, each of the at least one secondary unit serving a secondary zone, the propelled air serving a secondary zone of the building, primary unit and the at least one secondary unit sharing a common variable speed compressor, outdoor coil, and an outdoor fan; and wherein the compressor, outdoor coil and the outdoor fan are disposed within the primary unit.

Aspect 13. The method in accordance with aspect 12, wherein the disposing includes disposing an air handling unit in refrigerant communication with the primary unit.

Aspect 14. The method in accordance with any of aspects 12-13, wherein the disposing includes disposing a furnace coil in refrigerant communication with the primary unit.

Aspect 15. The method in accordance with any of aspects 12-14, further comprising reversing, by a reversing solenoid valve, the flow of the refrigerant to enable the primary unit to function as a heat pump and an air conditioner.

Aspect 16. The method in accordance with any of aspects 12-15, further comprising disposing the at least one secondary zone above the primary zone.

Aspect 17. The method in accordance with any of aspects 12-16, further comprising disposing the at least one secondary zone above the primary zone.

Aspect 18. The method in accordance with any of aspects 12-17, further comprising providing a lubricant with the refrigerant.

Aspect 19. The method in accordance with any of aspects 12-18, further comprising overriding the current user settings to circulate the refrigerant at a higher speed in the event the refrigerant is circulating at a speed inadequate to distribute the lubricant.

Aspect 20. The method in accordance with any of aspects 12-19, further comprising circulating the refrigerant at increased speed in the event the primary unit is disposed at a lower level than the secondary unit.

Aspect 21. The method in accordance with any of aspects 12-20, further comprising storing a plurality of primary and secondary health signatures within a diagnostic database, each primary health signature representing a pattern indicating the well being of the primary unit, each secondary health signature representing a pattern indicating the well being of the secondary unit; sensing an operational parameter of the primary unit; converting the primary unit sensor data into a primary health signature; sensing an operational parameter of the secondary unit; converting the secondary unit sensor data into a secondary health signature; verifying the converted primary and secondary health signatures against the stored primary and secondary heath signatures within the diagnostic database, and issuing an alert if a mismatch between a converted and a stored signature indicates a malfunction of the corresponding primary unit and/or secondary unit.

Particular embodiments of the present disclosure have been described herein, however, it is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in any appropriately detailed structure.

What is claimed is:

1. A climate control system for controlling a climate within a primary zone and at least one secondary zone of a building independently, the system comprising:
    a primary packaged unit comprising:
        a primary indoor coil configured for circulating a refrigerant therethrough; and
        a primary variable speed indoor fan configured to propel air through the primary indoor coil for delivery to the primary zone of the building; and
    at least one secondary unit disposed in refrigerant communication with the primary unit, each of the at least one secondary unit serving at least one of the at least one secondary zone, a secondary unit comprising:
        a secondary indoor coil configured for circulating the refrigerant therethrough; and
        a secondary variable speed indoor fan configured to propel air through the secondary indoor coil for delivery to at least one of the at least one secondary zone of the building;
    wherein the primary unit and the at least one secondary unit shares a common variable speed compressor, an outdoor coil, and an outdoor fan; and
    wherein the compressor, outdoor coil and the outdoor fan are disposed within the primary packaged unit.

2. The system in accordance with claim 1, wherein the secondary unit comprises an air handling unit.

3. The system in accordance with claim 1, wherein the secondary unit comprises a furnace coil.

4. The system in accordance with claim 1, wherein the primary unit further comprises a reversing solenoid valve disposed between the compressor and the primary indoor coil and between the compressor and the outdoor coil; the reversing valve configured to reverse the flow of refrigerant whereby allowing the primary unit to function as a heat pump and as an air conditioner.

5. The system in accordance with claim 1, wherein the at least one secondary zone is disposed above the primary zone.

6. The system in accordance with claim 1, wherein the at least one secondary zone is disposed below the primary zone.

7. The system in accordance with claim 1, wherein the refrigerant includes a lubricant.

8. The system in accordance with claim 7, further configured to override a current user setting thereof in the event the refrigerant is circulating at a speed inadequate to distribute the lubricant.

9. The system in accordance with claim 8, further configured to circulate the refrigerant at a higher speed when the primary unit is at a lower elevation than the secondary unit.

10. The system in accordance with claim 8, further configured to circulate the refrigerant at a higher speed when the primary unit is at a lower elevation than the secondary unit.

11. The system in accordance with claim 1, further comprising:
    a diagnostic database comprising a plurality of primary and secondary health signatures, each primary health signature representing a pattern indicating the well being of the primary unit, each secondary health signature representing a pattern indicating the well being of the secondary unit;
    at least one sensor for sensing an operation parameter associated with the primary unit and/or the secondary unit; and
    a primary diagnostic data collection unit for collecting the sensor data from the primary unit and for converting the primary sensor data into a primary health signature;
    a secondary diagnostic data collection unit for collecting the sensor data from the secondary unit and for converting the secondary sensor data into a secondary health signature;
    wherein the data collection units are configured to verify the primary and secondary heath signatures against the diagnostic database and wherein an alert is issued in the event a mismatch between the signatures indicates a malfunction of the corresponding primary unit, and/or secondary unit.

12. A method for controlling a climate within a primary zone and at least one secondary zone of a building independently, the method comprising:
    providing a primary packaged unit having a primary indoor coil configured for circulating a refrigerant therethrough and a primary variable speed indoor fan configured to propel air over the primary indoor coil, the blown air serving the primary zone of the building; and
    disposing at least one secondary unit in refrigerant communication with the primary unit, each of the at least one secondary unit comprising a secondary variable speed indoor coil configured for circulating a refrigerant therethrough and a secondary indoor fan configured to propel air through the secondary indoor coil, each of the at least one secondary unit serving at least one of the at least one secondary zone, the propelled air serving at least one of the at least one secondary zone of the building, primary unit and the at least one secondary unit sharing a common variable speed compressor, outdoor coil, and an outdoor fan; and wherein the compressor, outdoor coil and the outdoor fan are disposed within the primary unit.

13. The method in accordance with claim 12, wherein the disposing includes disposing an air handling unit in refrigerant communication with the primary unit.

14. The method in accordance with claim 12, wherein the disposing includes disposing a furnace coil in refrigerant communication with the primary unit.

15. The method in accordance with claim 12, further comprising reversing, by a reversing solenoid valve, the flow of the refrigerant to enable the primary unit to function as a heat pump and an air conditioner.

16. The method in accordance with claim 12, further comprising disposing the at least one secondary zone above the primary zone.

17. The method in accordance with claim 12, further comprising disposing the at least one secondary zone above the primary zone.

18. The method in accordance with claim 12, further comprising providing a lubricant with the refrigerant.

19. The method in accordance with claim 18, further comprising overriding the current user settings to circulate the refrigerant at a higher speed in the event the refrigerant is circulating at a speed inadequate to distribute the lubricant.

20. The method in accordance with claim 19, further comprising circulating the refrigerant at increased speed in the event the primary unit is disposed at a lower level than the secondary unit.

21. The method in accordance with claim 12, further comprising:
storing a plurality of primary and secondary health signatures within a diagnostic database, each primary health signature representing a pattern indicating the well being of the primary unit, each secondary health signature representing a pattern indicating the well being of the secondary unit;
sensing an operational parameter of the primary unit;
converting the primary unit sensor data into a primary health signature;
sensing an operational parameter of the secondary unit;
converting the secondary unit sensor data into a secondary health signature;
verifying the converted primary and secondary health signatures against the stored primary and secondary heath signatures within the diagnostic database; and
issuing an alert if a mismatch between a converted and a stored signature indicates a malfunction of the corresponding primary unit and/or secondary unit.

* * * * *